United States Patent [19]

Horn et al.

[11] Patent Number: 4,713,172

[45] Date of Patent: Dec. 15, 1987

[54] APPARATUS FOR IMPROVED AERATION OF LIQUIDS

[76] Inventors: Spencer C. Horn; Virginia Horn, both of P.O. Box 418, Fort Cobb, Okla. 73038

[21] Appl. No.: 874,643

[22] Filed: Jun. 16, 1986

[51] Int. Cl.[4] .............................. B01D 1/16; C02F 1/74
[52] U.S. Cl. .................................... 210/150; 210/170; 210/197; 159/47.3; 159/48.1; 159/905; 159/DIG. 28
[58] Field of Search ............... 210/150, 151, 170, 197, 210/199, 209, 220, 219, 615, 619, 747, 758; 159/47.3, 48.1, 905, DIG. 28

[56] References Cited

U.S. PATENT DOCUMENTS

| | | | |
|---|---|---|---|
| 3,301,401 | 1/1967 | Hall | 210/150 |
| 3,876,542 | 4/1975 | Carlson | 210/150 |
| 3,907,679 | 9/1975 | Yost | 159/905 X |
| 4,013,559 | 3/1977 | Johnson | 210/170 X |
| 4,137,171 | 1/1979 | Yokata | 210/150 |
| 4,428,842 | 1/1984 | House et al. | 210/747 |
| 4,449,849 | 5/1984 | Horn | 405/52 |
| 4,588,325 | 5/1986 | Seefert | 210/170 X |

Primary Examiner—Tom Wyse
Attorney, Agent, or Firm—Laney, Dougherty, Hessin & Beavers

[57] ABSTRACT

Apparatus for increasing the air/water interface of a body of liquid to increase vaporization that consists of a suction pick-up feeding liquid to a supply conduit which, in turn, is connected to a feeder pipe which distributes water down over an aeration assembly that is disposed proximate the body of liquid. The aeration assembly consists of a plurality of specialized cellular fiber panels arranged in any of a stationary linear array, rotatable radial array or horizontal spaced stack that are optimally wetted with the liquid to maximize contact with surrounding air.

17 Claims, 11 Drawing Figures

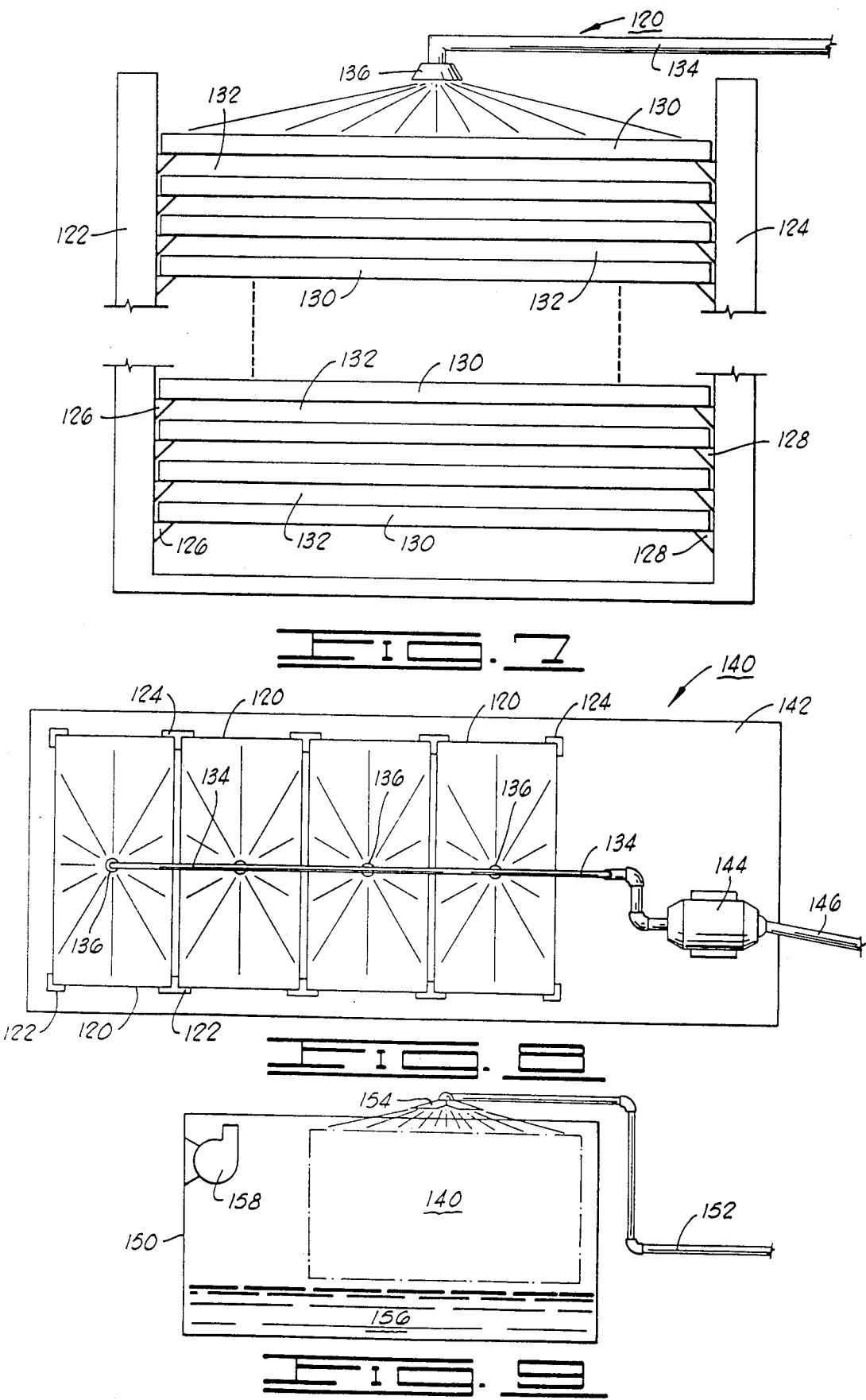

4,713,172

APPARATUS FOR IMPROVED AERATION OF LIQUIDS

BACKGROUND OF THE INVENTION

1. Field of the Invention

The invention relates generally to aeration processes for dispersion of liquids in air and, more particularly, but not by way of limitation, it relates to improved methods and apparatus for accelerating evaporation processes in waste water treatment and the like.

2. Description of the Prior Art

The prior art includes numerous types of aeration procedures as used in and around sewage lagoons and other water or liquid treatment processes. Such aeration practices of increasing air/liquid interface have been well established with little or no improving features for a long number of years as they function to effect a separation or a liquid purification result. The closest prior art known to Applicant which was specifically developed for evaporative elimination of oil well reserve pit fluids is the U.S. Pat. No. 4,449,849 entitled "Method of Removing Water From Earthen Pits".

SUMMARY OF THE INVENTION

The present invention relates to an improvement in processes for evaporative removal of liquids from a repository wherein particular precaution must be taken to confine the evaporation volume in strict observance of anti-pollution and other environmental considerations. As applied to removal of oil well reserve pits, the invention basically consists of a first stage evaporation procedure wherein liquid is removed from the storage pit and dispersed through a plurality of nozzles in the air volume generally located over the pit surface. At the same time, water or liquid removed from the pit is applied to a second stage evaporative apparatus which may consist of a pipeline-fed series of fibrous evaporation panels that are disposed optimally at an unsaturated volume of air space around the pit but still positioned within the bounds of the pit dikes. Alternative forms of evaporative apparatus are also proposed utilizing the evaporation panels in order to maintain evaporative efficiency per unit volume of space at or near saturation.

Therefore, it is an object of the present invention to provide a multi-stage evaporation procedure for effecting maximum liquid loss to air per unit time.

It is also an object of the present invention to provide a compact evaporation assembly for placing and maintaining a maximum amount of evaporated liquid within a selected volume of air.

It is still further an object of the present invention to provide a method for drying up oil well reserve pits more rapidly while observing all exigencies as to environmental restrictions.

It is yet another object of the present invention to provide a method for drying up reserve pits at a total cost much less than other means of removal.

Finally, it is an object of the present invention to provide evaporation techniques that can be altered or arranged to fit particular requirements of operation when used in any of oil well reserve pits, municipal sewage treatment stations, or other evaporation and purification facilities.

Other objects and advantages of the invention will be evident from the following detailed description when read in conjunction with the accompanying drawings which illustrate the invention.

BRIEF DESCRIPTION OF THE DRAWINGS

FIG. 6 is a view in elevation of a support structure with a plurality of fiber batt assemblies as shown in FIGS. 4 and 5;

FIG. 7 is a view in elevation of yet another alternative form of evaporative fiber batt aeration panel assembly;

FIG. 8 is a top plan view of a support structure utilizing a plurality of fiber batt structures as shown in FIG. 7;

FIG. 9 is an idealized view in vertical section of the manner in which a fiber batt assembly such as that of FIG. 7 might be utilized in an oil field storage tank or the like;

DETAILED DESCRIPTION OF THE INVENTION

Figure 1:
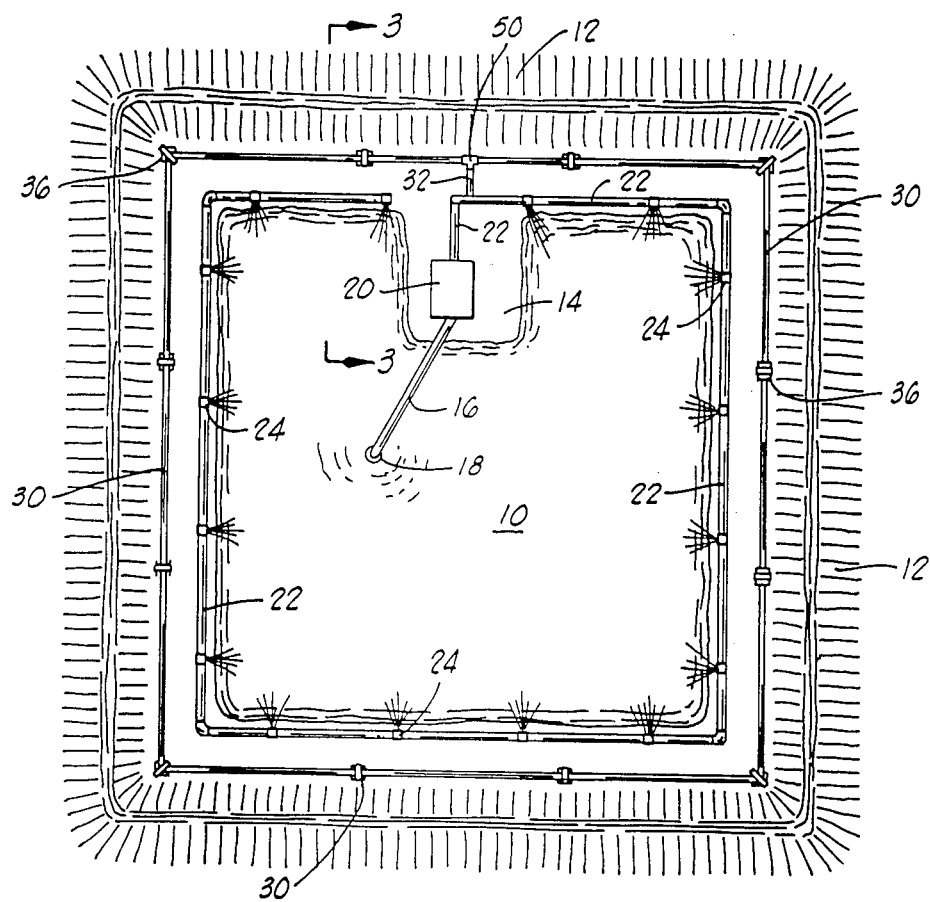
FIG. 1 is a plan view of an oil well reserve pit including first and second stage evaporative systems.

FIG. 1 illustrates one form of saturation apparatus for accelerated elimination of an oil well reserve pit that utilizes a combination of oil/water interface magnifying schemes. Thus, a typical earthen reserve pit is formed by such as a bulldozer and the removed earth is stacked around the pit as a confining dike 12. A small peninsular extension 14 is usually allowed to remain to provide footing for the well system gas flaring equipment.

A first system of liquid sprays is constructed in the manner of the prior art as described and claimed in U.S. Pat. No. 4,449,849, a patent owned by the present assignees. Thus, a suction hose 16 draws liquid out of the reserve pit 10 through a suitable strainer as affixed to a float 18 by means of a pump 20. Such fluid from pump 20, usually in the form of a water dispersion containing various chemical impurities characteristic of the oil field operation, is pumped via a serial spray conduit 22, e.g. four inch irrigation pipe or the like, around the reserve pit 10 in close proximity. A plurality of spray nozzles 24, e.g. a conventional type as commercially available, are affixed at spaced locations along conduit 22 so that their respective spray release is directed inward over the reserve pit 10 thereby to confine all residue to the pit itself. The spray nozzles 24 may be arranged at any selected spacing thereby to enable maximum saturation per volume of air immediately over the reserve pit surface.

In accordance with the invention, an aeration wall 30 is used in surround of the reserve pit 10 in order to provide accelerated aeration and evaporation of the reserve pit fluid. The aeration wall 30 may be used alone or in combination with the spray conduit 22 in an attempt to absolutely maximize liquid saturation in the area immediately over the reserve pit 10 thereby to maximize elimination speed in drying up the pit. The aeration wall 30 may be fed by input directly off of spray conduit 22 from liquid pump 20. Thus, such as a pipe section 32, e.g. two inch pipe, may be connected to extend up to the upward extremity of the aeration wall 30.

Figure 2:
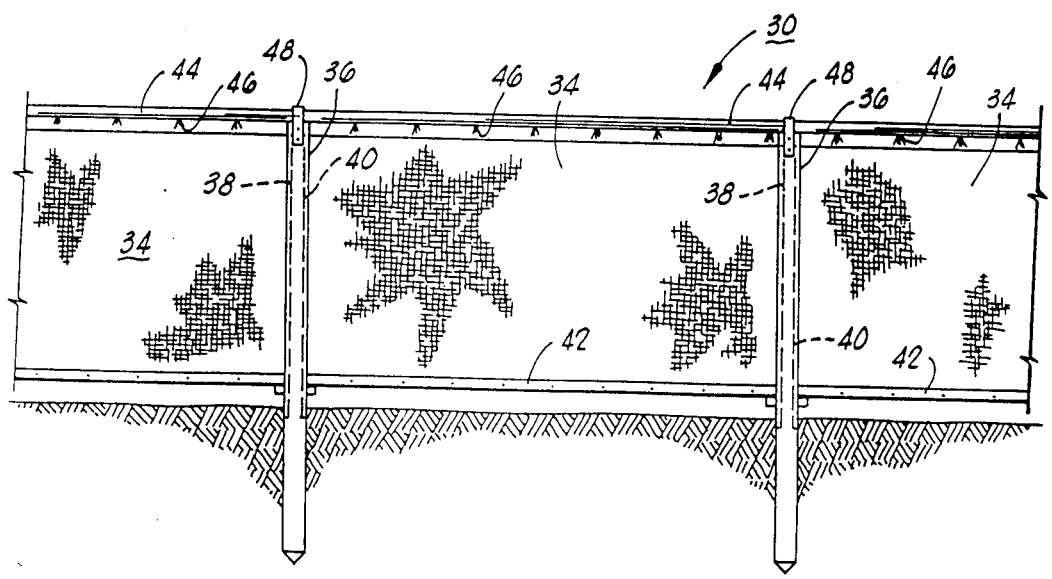
FIG. 2 is a view in elevation of a portion of an evaporative fiber batt array as used in FIG. 1.
Figure 3:
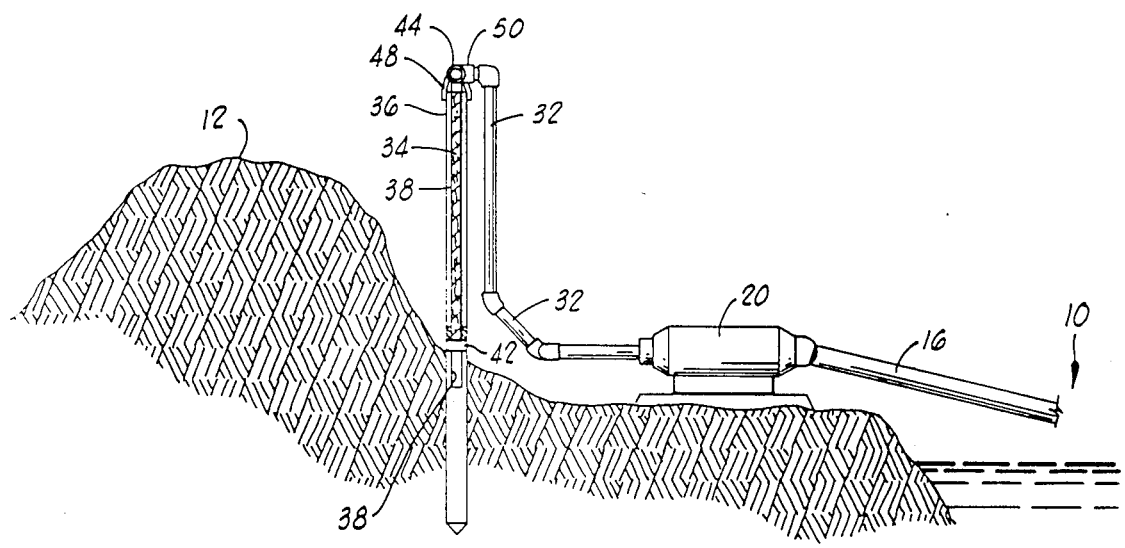
FIG. 3 is a section taken along lines 3—3 of FIG. 1.

Referring to FIGS. 2 and 3, the aeration wall 30 consists of a plurality of end-aligned drying panels 34. The panels 34 are supported in surround of reserve pit 10 by means of a plurality of periodically positioned supports or posts 36 as driven into the earth at the inside base of dike 12. It is contemplated that the posts 36 take the form of a generally square metal post having formation of slot indentions on two opposed sides thereby to seat or receive respective panels 34. Many variants of this design are possible, but it seems desirable to include the function of panel retention. The drying panels 34 are utilized in such as 4 foot×8 foot panels and they are supported between adjacent posts 36 and a horizontal brace 42 connected therebetween near ground level. A reduced diameter distribution pipe 44 having a large plurality of spaced fluid outlets 46 is retained to extend along the top of post 36 by means of respective metal straps 48. A suitable T-connection 50 (FIG. 1) provides connection to the input conduit 32 from pump 20.

While the aeration panels 34 may be formed from a number of substances, present design of the invention is constructed utilizing an evaporative cooling panel that is commercially available under the trademark AQUA CEL ® as available from Hobbs Bonded Fibers of Grosbeck, Texas. The fiber panels 34 may be assembled in 4 foot×8 foot sheets having about one-two inches thickness and they may or may not be stiffened or fortified by means of wire reinforcement. The panel structure provides a very stable hygroscopic cell structure that is resistant to acid or basic environments and is non-biodegradable. The panels also have bacteriostatic qualities that discourage slime and algae growth even with continual contact with water. The material has a very desirable liquid retentive character combined with relatively large porosity that enables a most desirable cooling efficiency versus air flow quotient.

Thus, the outlet 46 may be such as a suitable fan-shape spray nozzle, relatively closely spaced along conduits 44 thereby to maintain maximum wetting down along the sides of panels 34 to achieve maximum release of water vapor into the air to the exclusion of any impurities or solid residues. The AQUA CEL ® panels also exhibit low replacement and maintenance requirements due to the fact that it has high resistance to deterioration in air or water and is extremely free from effects of sun and cold weather variables. The idealized illustration of FIG. 1 shows a relatively few panel sections in surround of reserve pit 10; however, some reserve pits are quite large and may utilize a great number of serially aligned aeration panels 34 in order to maximize saturation of the volume of air overlaying the pit.

Figure 4:
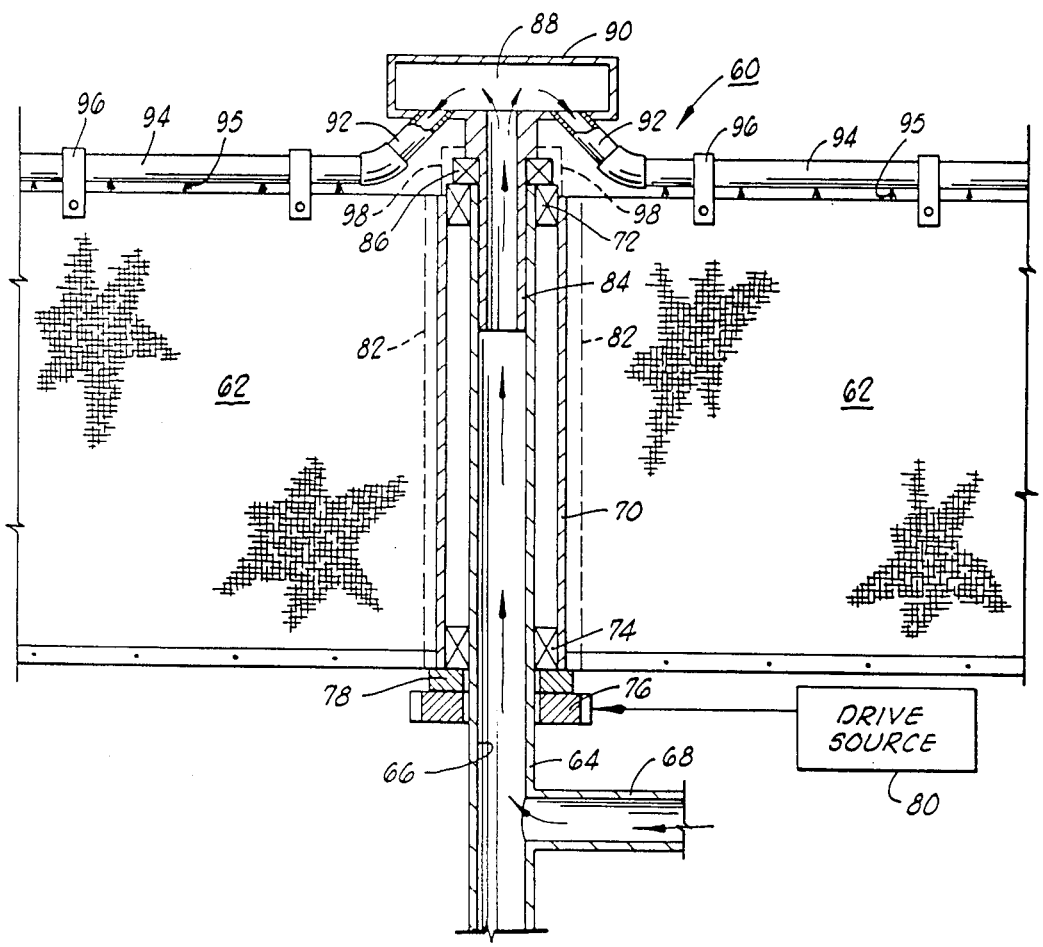
FIG. 4 is a vertical section through an alternative form of fiber batt aeration panel assembly.
Figure 3:
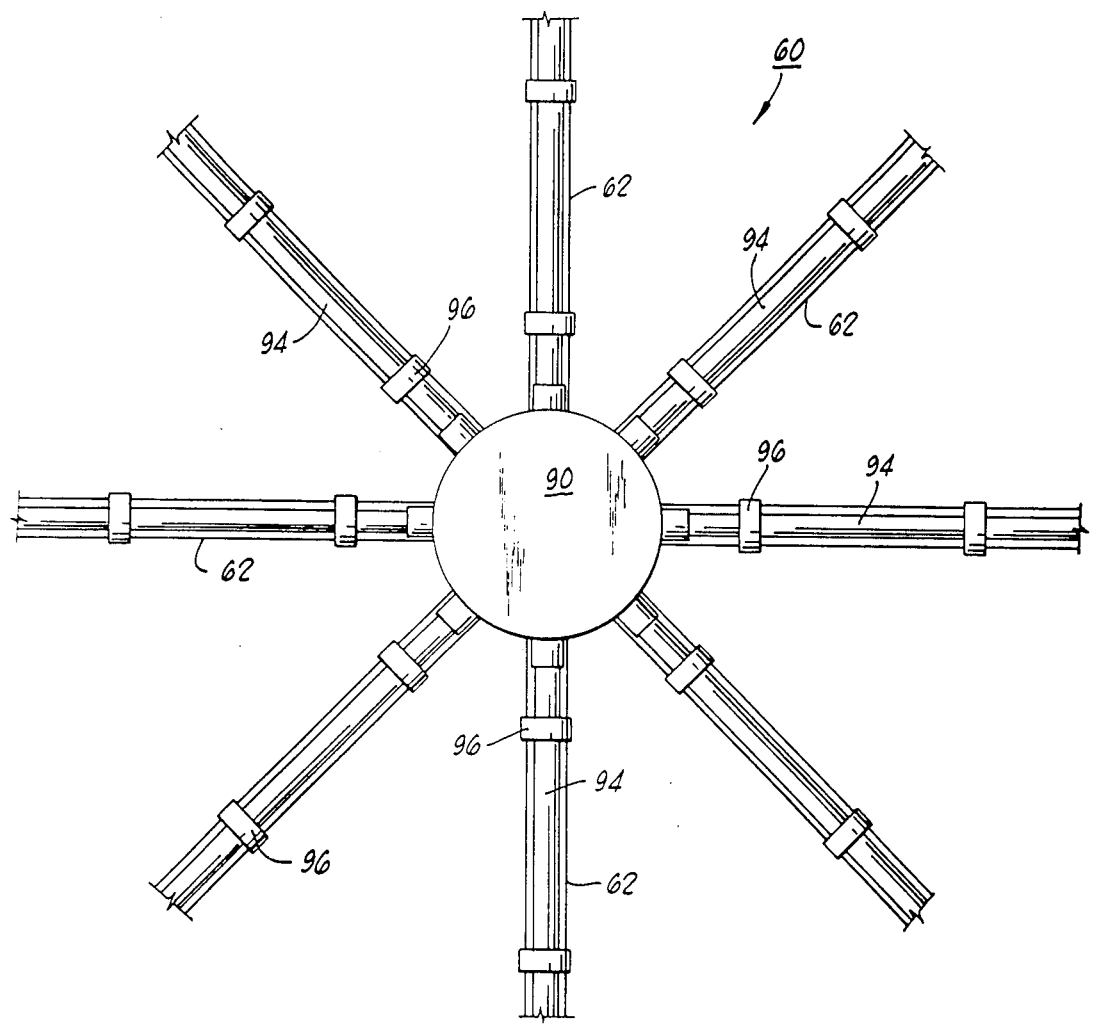
Figure 5:
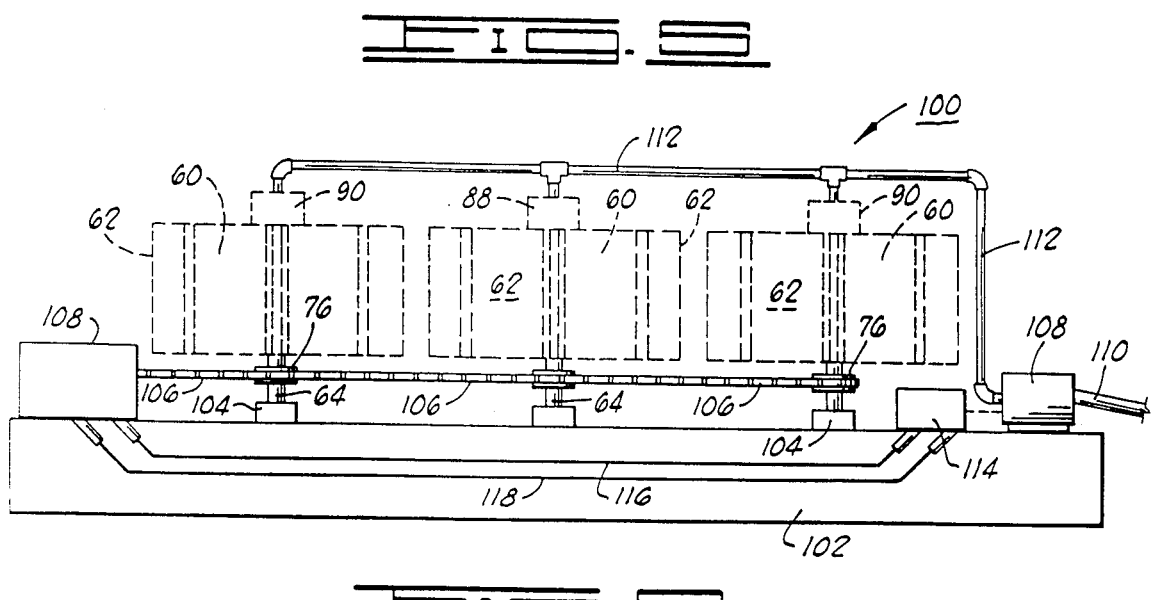
FIG. 5 is a top plan view of the batt assembly of FIG. 4.

FIGS. 4 and 5 relate to an alternative form of aeration assembly 60 that utilizes a plurality of aeration panels 62 as installed in rotative association at a pre-set point of operation. The aeration assembly 60 is also susceptible of being utilized in variously designed locational arrays in combination with other aeration apparatus in and around a reserve pit, sewage lagoon or other water body requiring evaporation or aeration cleansing. For example, a perimeterial spray apparatus such as perimeter conduit 22 of FIG. 1 may be utilized in combination with a plurality of aeration assemblies 60, disposed as required, to saturate whatever the volume of relatively confinable air space in immediate surround of the water body.

The rotative aeration assembly 60 can be disposed on a first upright conduit 64 that may be adapted for support by ground penetration or from a suitable base of port. Conduit or post 64 defines an internal flow way 66 in communication with a feed pipe 68 from a liquid source such as primary conduit 22 (FIG. 1). A cylinder 70 is rotatively supported on upright conduit 66 by means of upper and lower bearing assemblies 72 and 74, a drive gear 76 or other transmission element is rigidly affixed to a block 78 which, in turn, is secured to rotate cylinder 70, and a drive source 80 of selected type provides rotational drive input to the gear 76. Suitable channel members 82 may be secured as by welding about the periphery of cylinder 70 in equi-spaced manner in order to secure positioning of respective aeration panels 62 in operative alignment.

A feed head consisting of concentric pipe 84 is supported on an additional bearing member 86 to rotate with the overall assembly 60 while also providing an intermediate fluid reservoir 88. Reservoir 88 is contained within a cylindrical container 90 that is affixed to concentric feed pipe 84 to receive axial input of liquid. A plurality of feed pipes 92 connect from cylindrical housing 90 to each of respective radial feeder pipes 94 that overlay a respective aeration panel 62. A plurality of spray nozzles 95 provide fluid outlet and straps 96 are employed to secure positioning of radial feeder pipes 94 relative to their respective aeration panel 62. Spray nozzles 95 may alternatively be adjusted to spray liquid against the next preceding panel 62. In addition, a further suitable support connection, shown generally as dash-line 98, may be provided to insure proper affixure of the entire rotating assembly.

As shown in FIG. 5, there may be constructed a number of radial feeder pipes 94 with aeration panels 62, although there is an optimum number that results as a function of the immediate volume of air and its intrinsic saturation. In FIG. 5, there are eight such radial arrays and their individual lengths may also be varied. FIG. 4 illustrates a drive source 80 providing some form of rotational input to such as a drive gear 76; however, it should be understood that any of a number of conventional power sources and drive mechanisms may be utilized such as hydraulic, chain drive, belt drive, power take-off and the like. Primarily, selection of power source will be dictated by what is available in the particular application. Still further, it has been considered to include a ratchet-type water pressure drive such as is utilized in various forms of moving irrigation device.

FIG. 6 illustrates one form of field assembly 100 that utilizes a plurality of aeration assemblies 60 (FIGS. 4 and 5) as rotatively mounted on a suitable form of base 102. Base 102 may be such as a truck flatbed, slidable skid or even a pontoon for use in floating on and about reserve pits, lagoons and the like. Each of the support conduits 64 of the aeration assemblies 60 is rotatably supported in a suitable journal block 104 as secured on the surface support base 102. The respective drive gears 76 are then connected in serial succession to be rotated by a suitable form of drive chain 106 as driven by a drive mechanism 108.

A power source 108, including the suction pump drawing liquid via suction hose 110, provides liquid input via feed conduit 112 along the top of aeration assemblies 60 to provide axial input of liquid downward through the cylindrical feed heads 90 and reservoirs 88. This liquid, in turn, is then fed radially outward over the top of each of the respective aeration panels 62. The chain drive mechanism 108 may be driven by any of a number of different power sources and interconnections. In a preferred form, a hydraulic device 114, including reservoir, is powered by the power source 108, e.g. a gasoline engine, and hydraulic power is supplied via lines 116, 118 to a hydraulic motor in drive mechanism 108 which provides the rotational drive to drive chain 106.

In operation, the support base 102 may include a number of different aeration assemblies 60, and their respective rotations and spacing may be adjusted in accordance with the requirements of the particular application. The aeration assembly 100 may be used alone or it may be used in combination with other aeration structures situated in or around the particular reserve pit or lagoon. Thus, the aeration array of FIG. 1 utilizing both the perimeter spray conduit 22 and the aeration wall 30 may also utilize a pontoon-supported aeration assembly 100 out within the less saturated air volume overlying the reserve pit 10 thereby to effectively utilize all evaporatorial volume within bounds of the dike 12.

FIG. 7 illustrates still another alternative form of aeration stack assembly 120 that utilizes the cellular aeration panels. Thus, a suitable frame including upright members 122, 124 may include spaced brackets 126, 128 for receiving a respective aeration panel 130 and maintaining panels 130 in an equi-spaced relationship to allow air flow space 132 therebetween. Optimally, upright members 122 and 124 are respective pairs of spaced vertical posts or stanchions that also allow fullest air flow transversely through spaces 132.

Fluid input from a suction source is then applied via conduit 134 and a suitable spray nozzle or spray nozzle array 136 that allows adjustable, complete wetting of the upper aeration panel 130 during operation. It may be that a network of localized spray heads disposed in spaced relationship over such as a 4 foot×8 foot panel is most effective. The assembly 120 can be varied to include any selected number of aeration panels 130, and any selected inter-panel spacing, and these variables will be adjustable with interactive effect for various applications. Thus, without the need for large forced air intervention and the like, a stack assembly 120 can be utilized to greatly increase the air/water interface in a liquid processing application such that maximum liquid processing is achieved per unit time within a given volume of air space.

FIG. 8 illustrates an embodiment wherein a skid, pontoon or the like 142 is used in support of a plurality of aeration assemblies 120 (FIG. 7) as arrayed therealong. The assemblies 120 are top-wetted by means of feed conduit 134 extending from a suction pump 144 and suction line 146 as a respective spray nozzle 136 or array is positioned over each aeration assembly 120.

The stacked panel assembly 140 provides still another alternative apparatus that can be used alone or in combination with other perimeter or fenced panel arrays such as those illustrated in FIG. 1. The assembly 140 may be varied as to the number of individual stacks or aeration assemblies 120 as well as by the number of individual aeration panels 120 within each such stack.

The stack-type of approach provides a very effective way for maximizing air/water interface in a relatively defined volume of air space and, as shown in FIG. 9, such assembly 140 may be utilized variously to eliminate water from a fluid/solid system. FIG. 9 illustrates a usage that might be carried out in such as a discard fluids tank 150 of an oil well field battery. Thus, along with a heater treater and the requisite crude oil storage tanks, there is usually included a discard fluids tanks for containing salt water and other impurities that result from the oil well extraction process. Currently, such salt water and impurities must be hauled off by truck at a very high cost and disposed of in suitable manner authorized by environmental control agencies. Very often, this may require re-injection into the earth into a disposal well at very considerable cost.

Thus, it is contemplated that such as a panel stack assembly 140 be disposed at a certain upper level of tank 150 so that incoming discard fluids via a conduit 152 (from the well head) are deposited by a spray head 154 onto the panel stack assembly 140. Solid residue and liquid concentrates will work through to the lower extremities of tank 150 for deposit as liquid 156. Periodic energization of a blower 158 will aid evaporation and, while all liquids will not be exhausted, a good percentage will be lost through evaporation to lessen the number of barrels to be removed by other more costly means.

Figure 10:
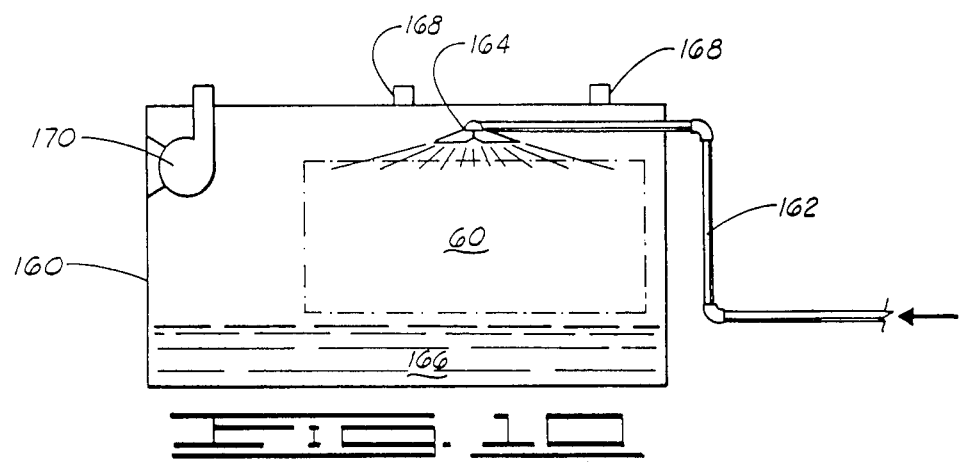
FIG. 10 is an alternative structure shown in idealized vertical section for waste water dissipation using the batt assembly of FIG. 4.
Figure 11:
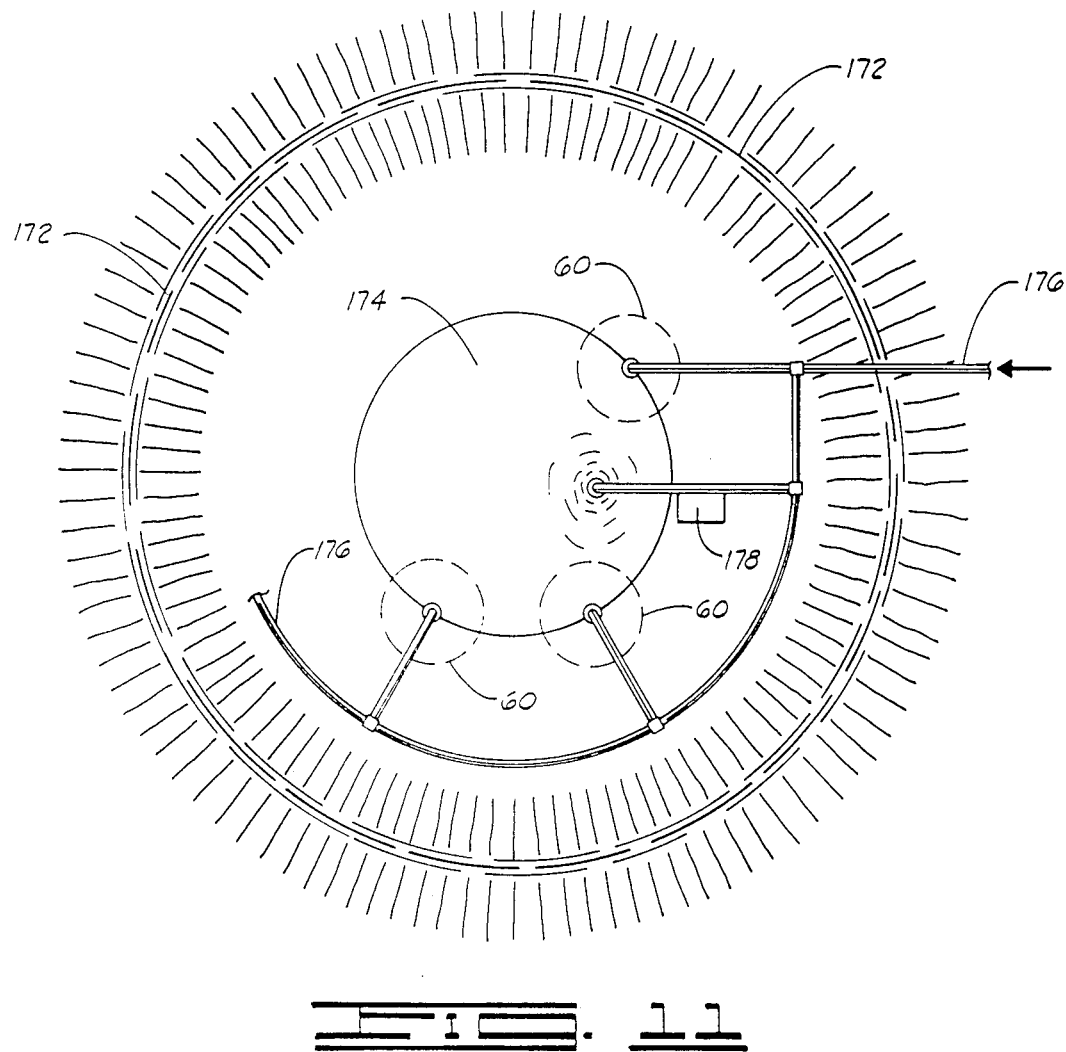
FIG. 11 is yet another alternative form of structure for economical waste water dissipation.

FIG. 10 illustrates another waste water tank arrangement that may be utilized in the field with tank battery equipment. Thus, a tank 160 receives waste fluid input via conduit 162 to a suitable spray head 164 which distributes fluid over a rotating aeration assembly 60, as fully discussed in relation to FIGS. 4 and 5. Some fluid will pass through assembly 60 for collection as concentrate 166, but a large volume of vaporizable fluid will be removed from the individual panels 62 of assembly 60 as air is drawn down through vents 168 by blower 170 for subsequent exhaust from the tank 160. FIG. 11 illustrates another waste water disposal method wherein an earthen dike 172 is used in surround of an in-ground, open top tank 174 having side wall 176. A plurality of rotating aeration assemblies 60 may then be utilized in a suitable array proximate the tank 174 so that a considerable volume of waste fluid is dissipated by evaporation while any residue falls down and flows into the tank 174.

Waste fluid may be received and distributed on conduit 176 for input to the respective aeration assemblies 60. A recirculation pump 178 allows suction pickup of fluid from tank 174 for re-flow over the aeration assemblies 60. This may be an important function since most wells produce waste fluid periodically or at widely varying volume, and the maximum of aeration time can be achieved by recirculation during slow production periods. A suitable local power source may provide all of pump and aeration assembly rotation, as described in FIG. 6.

Changes may be made in combination and arrangement of elements as heretofore set forth in the specification and shown in the drawings; it being understood that changes may be made in the embodiments disclosed without departing from the spirit and scope of the invention as set forth in the following claims.

What is claimed is:

1. Apparatus for increasing the air/liquid interface of a body of liquid, comprising:
   suction means for drawing liquid from said body;

distribution conduit means connected to said suction means to distribute liquid to selected points around the area wherein the liquid body is contained;

aeration panel means in the form of generally flat, cellular sheet supported vertically upright to expose a generally horizontal top portion and being disposed at a position proximate the liquid body area;

feeder pipe means disposed along said top portion of the panel means, said pipe means including a multiple of spaced liquid discharge openings along said top portion; and means connecting said distribution conduit means and said feeder pipe means; whereby liquid is distributed continuously along the panel means top portion for downward flow and distribution over said panel means thereby to increase the air/liquid interface to accelerate evaporation and separation of liquid components.

2. Apparatus as set forth in claim 1 wherein said aeration panel means comprises:

plural support members secured to extend around at least a portion of said body of liquid proximate the edge of the liquid; and plural aeration panels each retained between a respective adjacent pair of support members.

3. Apparatus as set forth in claim 2 wherein said feeder pipe means comprises:

plural sections of pipe each having a multiple of spaced liquid discharge openings said sections being connected serially and secured along the top portion of all said aeration panels.

4. Apparatus as set forth in claim 3 which is further characterized in that:

said distribution conduit means extends around the edge of said body of liquid and includes a plurality of spaced spray nozzles directing said liquid over the body of liquid.

5. Apparatus as set forth in claim 3 wherein:

said aeration panel means is a porous panel of synthetic fibers firmly bonded together and coated with absorbent cellular foam, and having a thickness of about 1½ to 2 inches.

6. Apparatus as set forth in claim 1 which is further characterized in that:

said distribution conduit means extends around the edge of said body of liquid and includes a plurality of spaced spray nozzles directing said liquid over the body of liquid.

7. Apparatus as set forth in claim 1 wherein said aeration panel means comprises:

base support means for movable disposition;

an upright support conduit secured on said base support means and receiving liquid input from the distribution conduit means at the bottom for conduction upward therethrough;

a support cylinder rotatably retained on said support conduit; and plural aeration panel means connected to extend radially from said support cylinder.

8. Apparatus as set forth in claim 7 wherein said means connecting comprises:

reservoir means rotatably mounted in fluid-tight relationship on said support conduit; and plural feeder pipes connecting between said reservoir means and each of said feeder pipe means disposed over a respective aeration panel means top portion.

9. Apparatus as set forth in claim 8 which is further characterized in that:

said base support means includes plural support conduits each having a rotatable support cylinder, plural aeration panel means, reservoir means and plural feeder pipe connectors.

10. Apparatus as set forth in claim 9 which further includes:

drive means connected to impart rotation to each of said support cylinders.

11. Apparatus as set forth in claim 8 which further includes:

drive means connected to impart rotation to said support cylinder.

12. Apparatus as set forth in claim 11 wherein:

said feeder pipe means includes a plurality of spaced spray nozzles directing discharge toward the upper regions of the next preceding radial aeration panel means.

13. Apparatus as set forth in claim 11 wherein:

said aeration panel means is a porous panel of synthetic fibers firmly bonded together and coated with absorbent cellular foam, and having a thickness of about 1½ to 2 inches.

14. Apparatus as set forth in claim 1 wherein said aeration panel means comprises:

a plural aeration panel stack of similar dimension aeration panels each disposed in horizontal attitude and in spaced, vertical overlay; and means supporting said aeration panels in generally equal spacing with said feeder pipe means disposed over said uppermost aeration panel.

15. Apparatus as set forth in claim 14 which is further characterized to include:

a plurality of said aeration panel stacks each receiving feeder pipe wetting on the respective top portion.

16. Apparatus as set forth in claim 15 which further includes:

means for causing increased air passage through the interspacings of said aeration panel stacks.

17. Apparatus as set forth in claim 15 wherein:

said aeration panel means is a porous panel of synthetic fibers firmly bonded together and coated with absorbent cellular foam, and having a thickness of about 1½ to 2 inches.

* * * * *